(12) United States Patent
Ferman et al.

(10) Patent No.: US 8,449,126 B2
(45) Date of Patent: May 28, 2013

(54) REAR VIEW MIRROR

(76) Inventors: Michael Ferman, Peakhurst (AU);
Oliver Clemens Robert Kratzer, Sydney (AU)

( * ) Notice: Subject to any disclaimer, the term of this patent is extended or adjusted under 35 U.S.C. 154(b) by 540 days.

(21) Appl. No.: 12/676,141

(22) PCT Filed: Sep. 3, 2008

(86) PCT No.: PCT/AU2008/001303
§ 371 (c)(1),
(2), (4) Date: Mar. 25, 2010

(87) PCT Pub. No.: WO2009/029978
PCT Pub. Date: Mar. 12, 2009

(65) Prior Publication Data
US 2010/0202072 A1    Aug. 12, 2010

(30) Foreign Application Priority Data
Sep. 3, 2007    (AU) .................................. 2007904749

(51) Int. Cl.
G02B 7/182    (2006.01)
A47G 1/24    (2006.01)
B60R 1/02    (2006.01)

(52) U.S. Cl.
USPC ............................................ 359/871; 248/477

(58) Field of Classification Search
USPC ..................... 359/864, 875, 871; 248/477
See application file for complete search history.

(56) References Cited

U.S. PATENT DOCUMENTS

| 5,621,577 A | * | 4/1997 | Lang et al. | 359/872 |
| 5,687,035 A | * | 11/1997 | Lang | 359/864 |
| 2001/0012164 A1 | * | 8/2001 | Englander | 359/864 |
| 2003/0043482 A1 | * | 3/2003 | Swindon et al. | 359/877 |

* cited by examiner

*Primary Examiner* — Alessandro Amari
(74) *Attorney, Agent, or Firm* — Michael Molins

(57) ABSTRACT

A rear view mirror for a vehicle has certain asymmetrical aerodynamic features that are combined with construction details that render the assembly invertible for use on either side of the vehicle and easier to install than its prior art counterparts.

12 Claims, 12 Drawing Sheets

REAR VIEW MIRROR

FIELD OF THE INVENTION

The invention pertains to automotive mirrors and more particularly to a pole mounted mirror for buses, trucks and the like.

BACKGROUND OF THE INVENTION

Large vehicles such as buses, trucks and off road vehicles use external rear view mirrors that allow the driver to look both laterally and to the rear of the vehicle. Often these external rear view mirrors are mounted on vertical poles that are located on the outside of the vehicle. These mirrors are generally shaped as elongated rectangles. Mirrors of this type contribute to drag and wind noise when the vehicle is in motion.

Although it is an advantage to provide an external rear mirror with electric actuators, there are also drawbacks. Electric actuators allow the driver to adjust the mirrors tilt and pan angles from inside the vehicle. However, the actuators themselves and the housings and mountings that they require add to the cost, complexity and weight of the overall mirror assembly. The final assembly process itself is complicated by the actuator's, their mountings and housings.

The above matters are further complicated by the fact that some external rear view mirrors comprise a combination of a flat mirror together with a curved mirror. The flat mirror is usually the larger of the two and provides a conventional flat reflective surface. The flat mirror may sometimes combined with a smaller convex mirror that provides a wider but distorted field of view. Thus, mirror assembly may comprise a pair of mirrors, a pair of actuators, a pair of actuator mountings etc combined within a single housing. Having distinct non-identical upper and lower mirrors makes it more difficult to provide an assembly structure that can be used in both an upright and an inverted orientation. When a mirror can be used in an inverted orientation it makes the mirror suitable for mounting on either side of the vehicle in those instances where the mirror has desirable aerodynamic features that make it asymmetrical.

OBJECTS AND SUMMARY OF THE INVENTION

It is an object of the invention to provide and external rear view mirror assembly that addresses and provides an alternative to at least some of the deficiencies in prior art devices.

More specifically, it is an object of the invention to provide a mirror assembly having asymmetrical aerodynamic features that are combined with construction details that render the assembly potentially lighter and more versatile and easier to install than its prior art counterparts.

Accordingly, there is provided a mirror assembly comprising a chassis and a cover. The chassis is adapted to be mounted onto an external vertical pole. The cover is adapted to be mounted onto the chassis over the pole.

Together, the chassis and its cover may be mounted on either side of a vehicle, that is, in both upright and inverted orientations.

In preferred embodiments, the chassis and its cover may be mounted in a plurality of laterally spaced apart locations with respect to the vertical pole.

In other embodiments of the invention, the chassis accommodates an internal clip that temporarily binds onto the vertical pole, thereby facilitating assembly.

In other embodiments of the invention, the lateral adjustment of the chassis and its frame is facilitated by the provision of two or more vertically aligned pairs of openings. At least one opening is provided with a sealing grommet. At least one other opening is provided with a grommet having a pole receiving aperture formed in it.

BRIEF DESCRIPTION OF THE DRAWING FIGURES

In order that the invention be better understood, reference is now made to the following drawing figures in which.

BEST MODE AND OTHER EMBODIMENTS

Figures 1, 2:
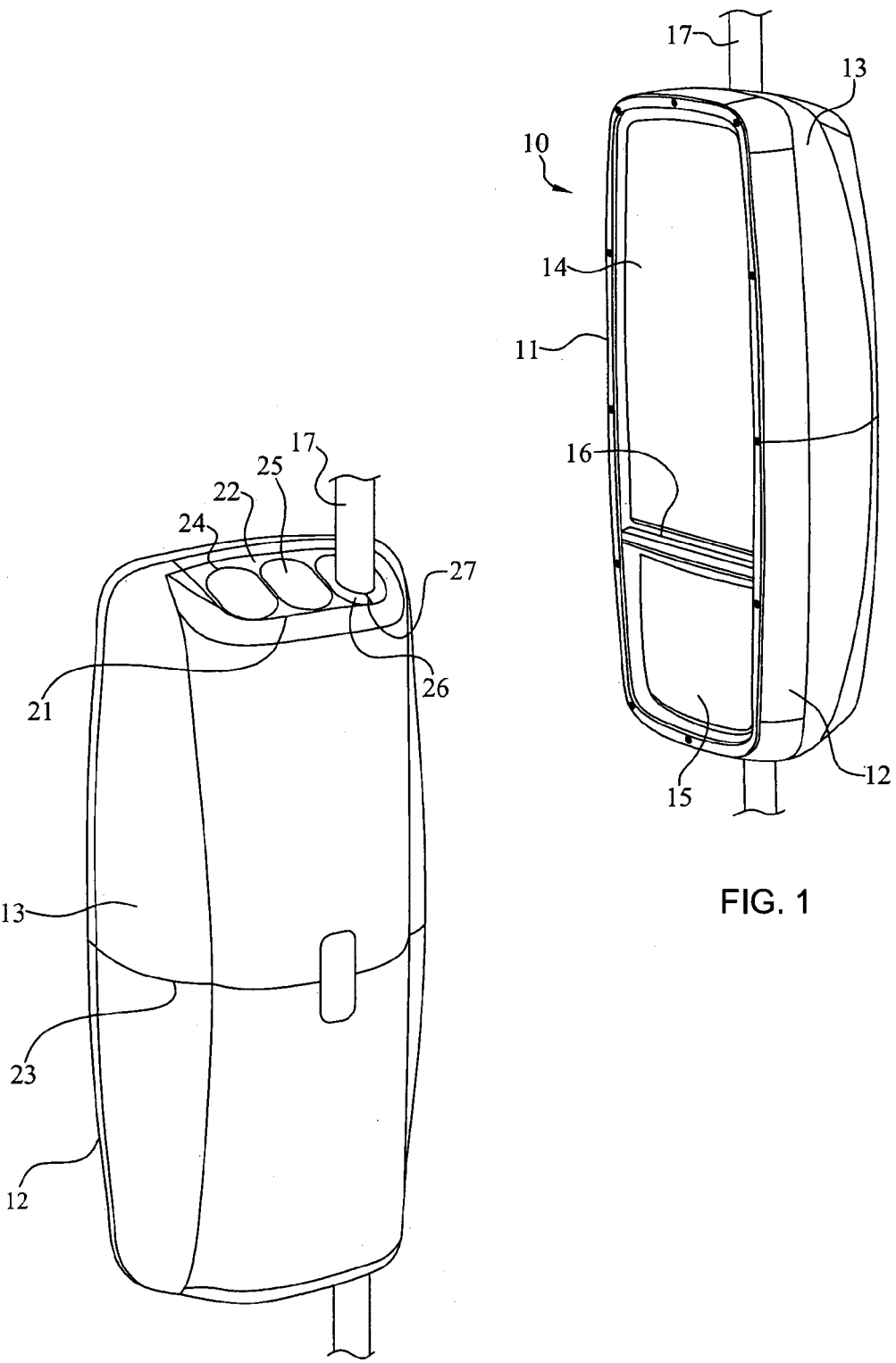
FIG. 1 is a perspective view of a rear view mirror incorporating the teachings of the present invention.
FIG. 2 is a rear perspective view of the device depicted in FIG. 1.

As shown in FIG. 1, an external, remotely adjustable rear view mirror 10 comprises a housing formed from a chassis 11 with an externally visible rim 12, and a shell-like cover 13. The chassis 11 retains (for example) a flat or convex and elongated top mirror 14 and a smaller convex mirror 15 that are separated by one another by a location adjustable divider 16. Each of the mirrors 14, 15 is (optionally) independently adjustable by way of its own electric motorised actuator.

As shown in FIG. 2, the chassis 12 and cover 13 are symmetrical (top to bottom) about a transverse axis 23. For all intents and purposes, the structure of the chassis and cover is the same above the transverse midline 23 as below the transverse midline 23. However, the mirror is not laterally symmetrical with respect to its longitudinal axis. As shown, for example in the top plan view of FIG. 15, the chassis 12 and cover 13 define a leading edge 150 and a trailing edge 151. In gross terms, the leading edge 150 has a larger radius of curvature than the trailing edge 151. Thus, when the mirror is supported by a vertical pole 17 and tilted so that the vehicle's driver can use it, the leading edge 150 encounters the moving air stream before the trailing edge 151. Just as the leading edge of a wing has a greater radius of curvature than the trailing edge of a wing, providing the mirror with a leading and a trailing edge gives the mirror aerodynamic qualities that reduce drag and noise when the vehicle is moving.

A mirror of this type would not be usable on both sides of a vehicle unless it can be inverted or used upside down. Thus the top to bottom symmetry depicted in FIG. 2 is essential in preserving the aerodynamic features of the mirror assembly 10 in instances where the same mirror assembly is used on both side of a vehicles.

FIG. 2 also illustrates how the location of the mirror with respect to the vertical pole 17 may be adjusted laterally. Keeping in mind that the assembly is symmetrical about the mid line 23, both the top and the bottom of the assembly (as will be further explained) are provided with generally oval shaped or elongated openings 24. Openings 24 are provided in cooperating top and bottom pairs (see FIG. 3). A vertical pole 17 can pass through any of the pairs. In the example depicted in FIG. 2, three pairs of openings are provided. Openings 24 that are not in use are blocked by a polymer grommet 25. The interior of the assembly is protected from the elements by a grommet 26 having a central opening through which the pole 17 passes. In order to more conveniently fit the grommet 26 around the pole, a slot 27 extends from the rim of the grommet to the grommet's central opening.

Figure 3:
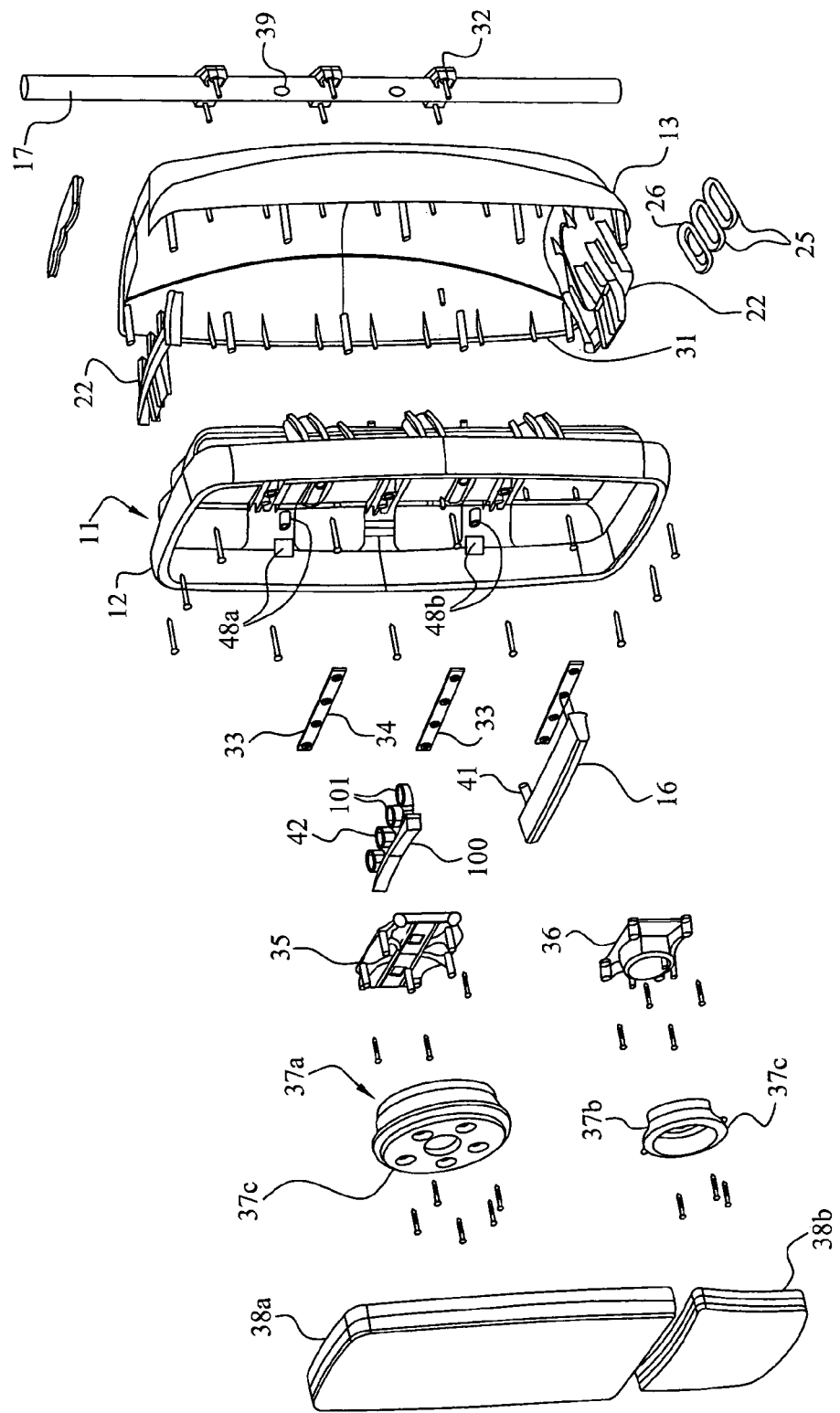
FIG. 3 is an exploded perspective view of the device depicted in FIGS. 1 and 2.

FIG. 3 provides an exploded perspective view of the main components of the subject technology. As shown there, the chassis 11 has a surrounding rim 12 that engages the rim 31 of the moulded cover 13. As will be explained with reference to FIGS. 4 and 5, the chassis 11 includes a rear mounting surface having features to engage the vertical pole 17. The vertical pole 17 is provided on the vehicle and does not form a part of the mirror assembly or a part of the invention. Plurality of bridges (or saddle clamps) 32 are used to attach the chassis to the pole 17. Metallic plates 33 with threaded openings 34 may be positioned on the interior surface of the chassis so that the fasteners that pass through the bridges 32 can be received by the threaded openings 34. In effect, this clamps the chassis between the bridges 32 and the plates 33.

The interior surface of the chassis 11 is also adapted to receive the bridge 16, preferably in three distinct locations. An optional middle location allows the bridge to subdivide the internal space of the chassis into equally sized top and bottom segments. This allows equally sized top and bottom mirrors to be fitted to the assembly. In the alternative, the internal space of the chassis can be subdivided as illustrated in FIG. 1, creating the opportunity to mount both a larger flat mirror and a smaller convex mirror. By providing both top and bottom mounting locations for the divider 16, the assembly retains its ability to be inverted without any change in appearance, features or functionality.

The interior surface of the chassis is also adapted to receive e.g. two different styles of adaptor plates 35, 36. The adaptor plates 35, 36 may be located in a variety of locations and orientations as will be further explained. Each separately moulded adaptor plate 35, 36 is adapted to retain a motorised actuator assembly 37a, 37b. Each actuator 37 is adapted to attach to the rear surface of a mirror unit 38a, 38b. As shown in FIG. 3, two different style mirror units can be used in the same mirror assembly 10. In this example, the upper mirror unit 38a comprises an elongated and generally rectangular flat mirror with optional electric heating element. The lower of smaller mirror 38b is optionally convex and may also incorporate an electronic heater. The wiring necessary to operate the actuators 37a, 37b and the heaters associated with the mirrors is intended to pass through the hollow vertical tube 17 and exit through openings 39 that lead into the interior of the mirror assembly 10.

Figure 4:
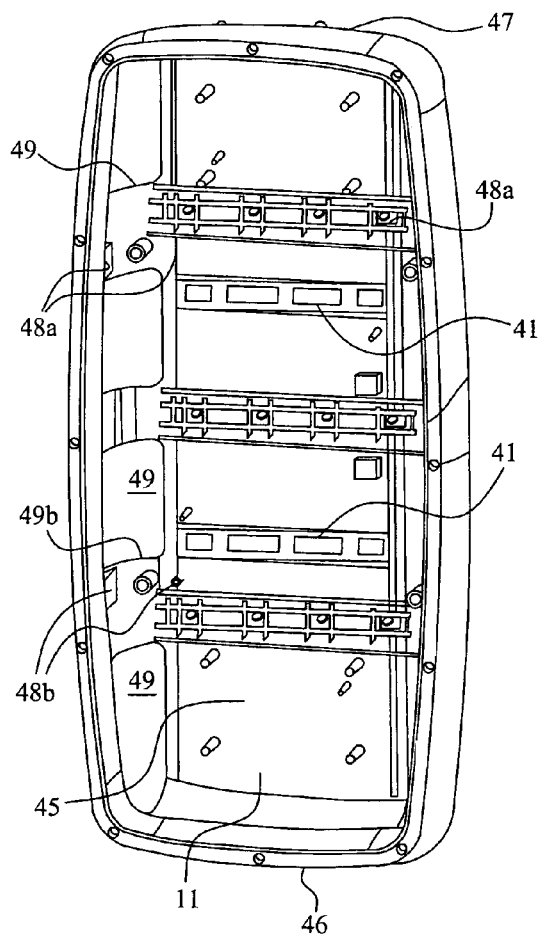
FIG. 4 is a front perspective view of the chassis depicted in FIG. 3.
Figure 5:
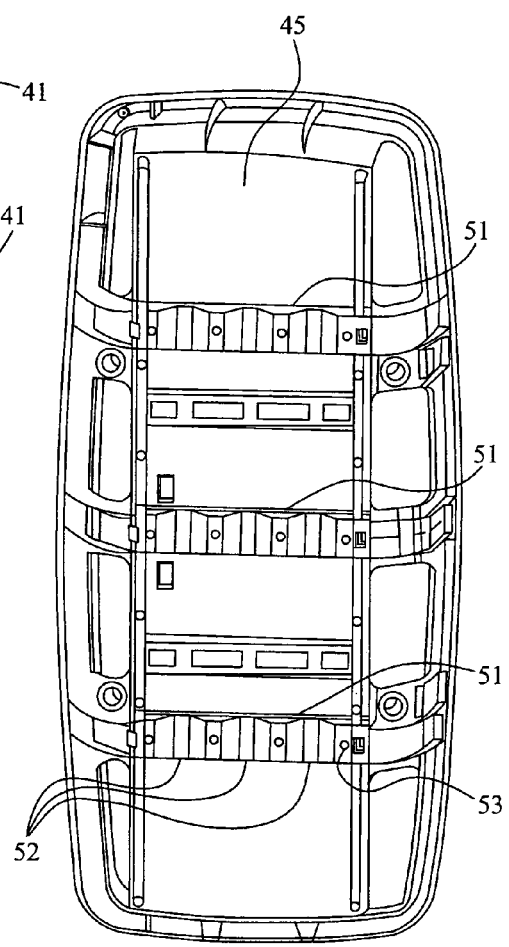
FIG. 5 is a rear perspective view of the chassis depicted in FIG. 4.

With reference to FIGS. 3, 4 and 5 it can be seen that the chassis incorporates one or more arrays 41 of rectangular openings. Each array 41 is intended to receive an assembly clip 42 (see FIG. 3 and FIG. 10). The assembly clip 42 comprises a spine 100 from which extend a number of generally flexible fingers 101. Adjacent fingers 101 define a neck region 102 that is adapted to receive a vertical pole 17. Because the fingers are flexible, the neck region initially resists but then allows the pole 17 to pass into a clamping space 43. When in the clamping space 43, the pole 17 is retained adequately to allow a human assembler to complete the assembly process without needing their hands to maintain the pole 17 in contact and in alignment with the chassis 11. Note from FIG. 3 that the assembly clamp 42 enters the array 41 from the internal surface of the chassis, the fingers 101 extending through the rectangular openings of the array so as to clamp the pole 17 to the opposite or external side of the chassis. When the assembly clip is separately moulded, the size of the clip and the material can be altered to suit a range of pole diameters and can be made of material (plastic or metal) more resilient and elastic than the chassis material. However, the assembly clip may be integrally moulded into the chassis.

FIG. 4 shows the internal surfaces of the chassis 11. It can be seen that the primary functional structure of the chassis comprises a longitudinal web 45 that extends from one end 46 to the other end 47 of the chassis. This web is provided with the arrays of rectangular openings 41 previously discussed. The web also provides the bosses and locating pins necessary to establish the position and location of the adaptor plates. The longitudinal web 45 also establishes the three mounting locations (nominally, top 48a and bottom 48b) for the divider 16.

The weight of the chassis has been reduced by providing large through openings 49 that define transverse legs 49a that serve to attach the side edges of the web 45 to the rim of the chassis.

As shown in FIG. 5, the rear or back surface of the central web 45 features "V" shaped pole retaining grooves. In this example, the grooves are arranged in three rows 51, each row containing three grooves 52. Each groove is flanked by a pair of openings 53 that are used by the fasteners associated with the bridges or saddle clamps 32. The "V" shaped grooves are in vertical alignment and are positioned to cooperate with the pairs of vertically aligned openings defined by the cover and the cover blanks 13, 22.

Figure 6:
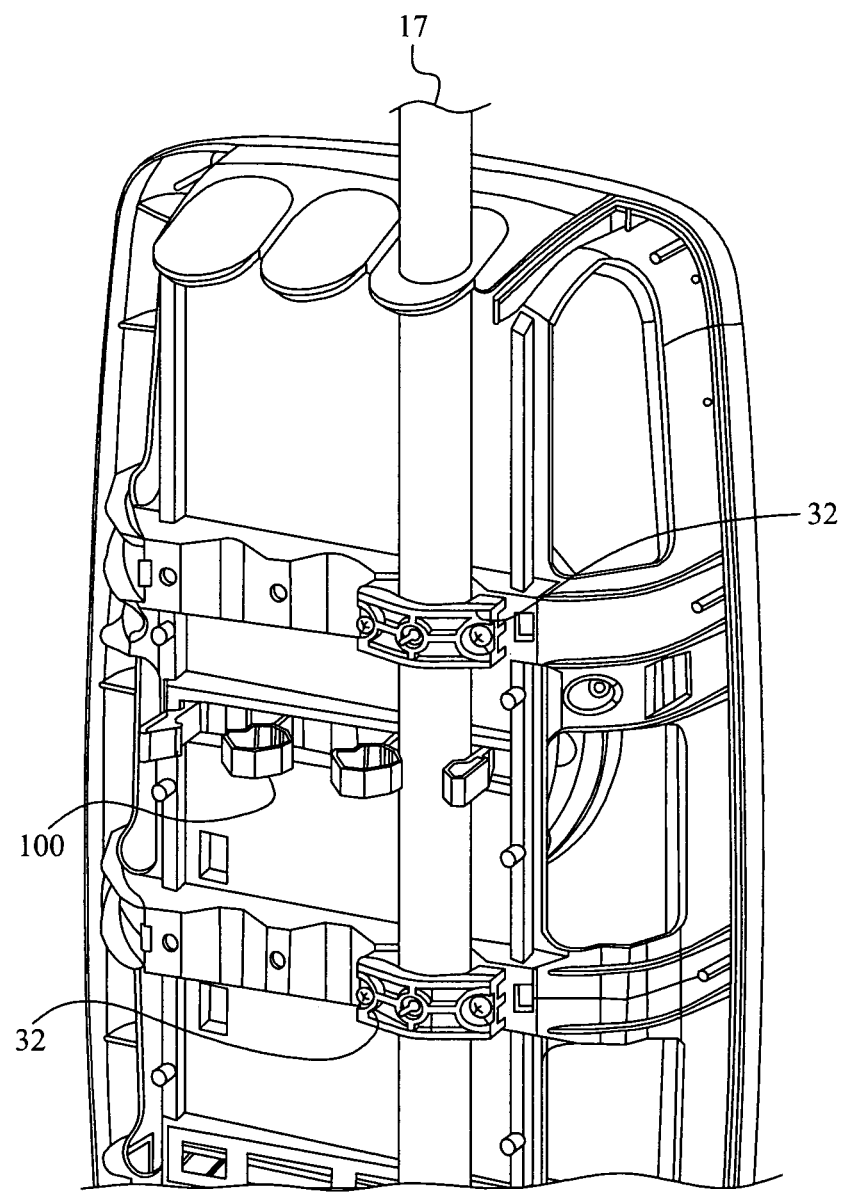
FIG. 6 is a rear perspective view depicting, in detail, the arrangement of vertical pole, saddle clamps, assembly clip and grommets.

As better seen in FIG. 6, the vertical pole 17 has been located within a perforated grommet, and clamped into position, first by the assembly clamp 100 and eventually by the location and fixation of the bridges 32 with their associated fasteners.

Figure 7:
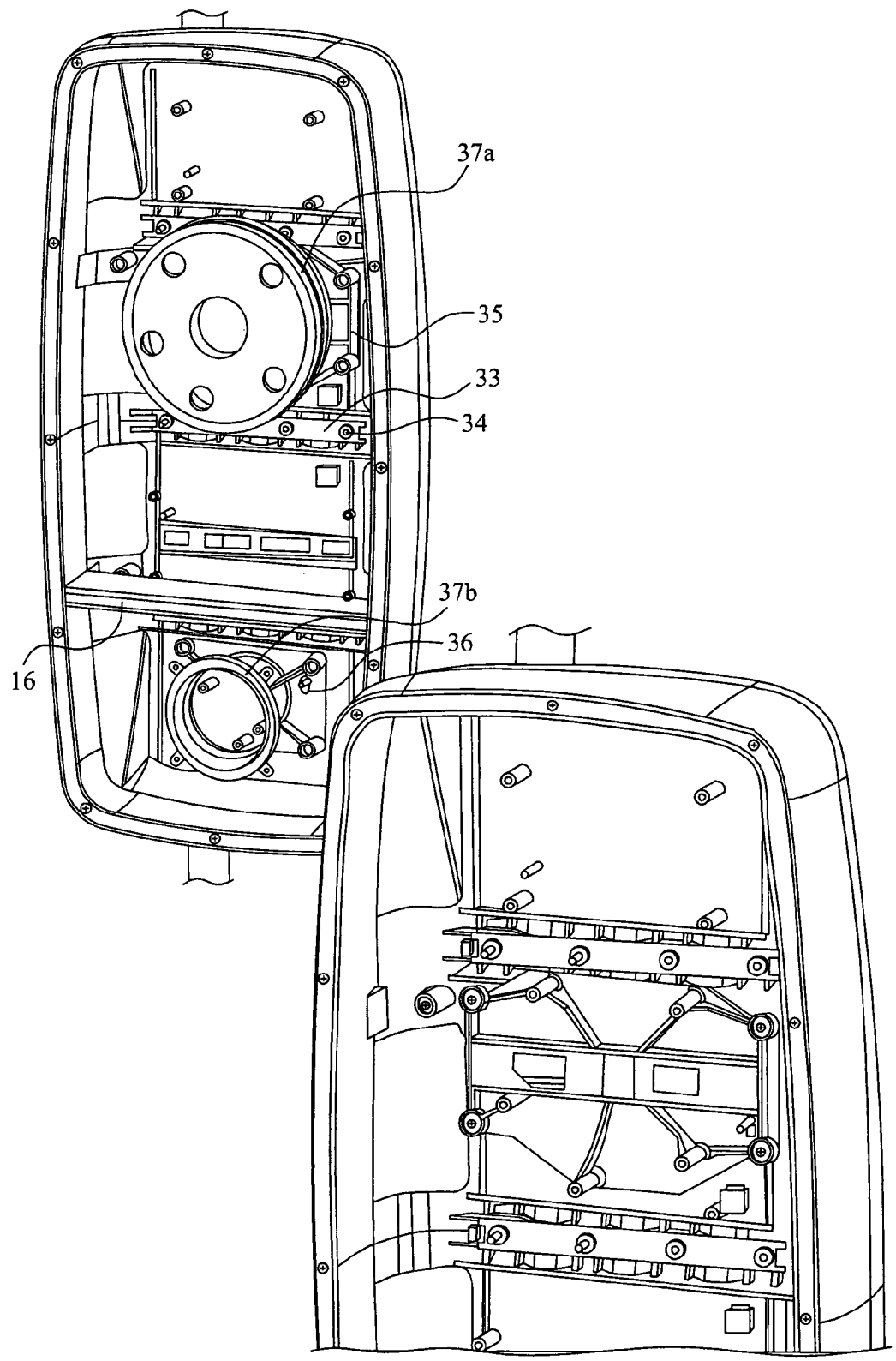
FIG. 7 is a front perspective view, mirrors removed, illustrating the location of the actuators.

FIG. 7 illustrates the adaptor plates 35, 36 located onto the interior surface of the chassis. Each of the adaptor plates 35, 36 is shown as supporting an electronic actuator 37a, 37b. Note the presence of the metal plates 33 with threaded openings 34 used in the retention of the bridges 32. Also note the positioning and location of the divider 16 into the lateral openings and locating posts 48b (see FIGS. 3 and 4).

Figure 8:
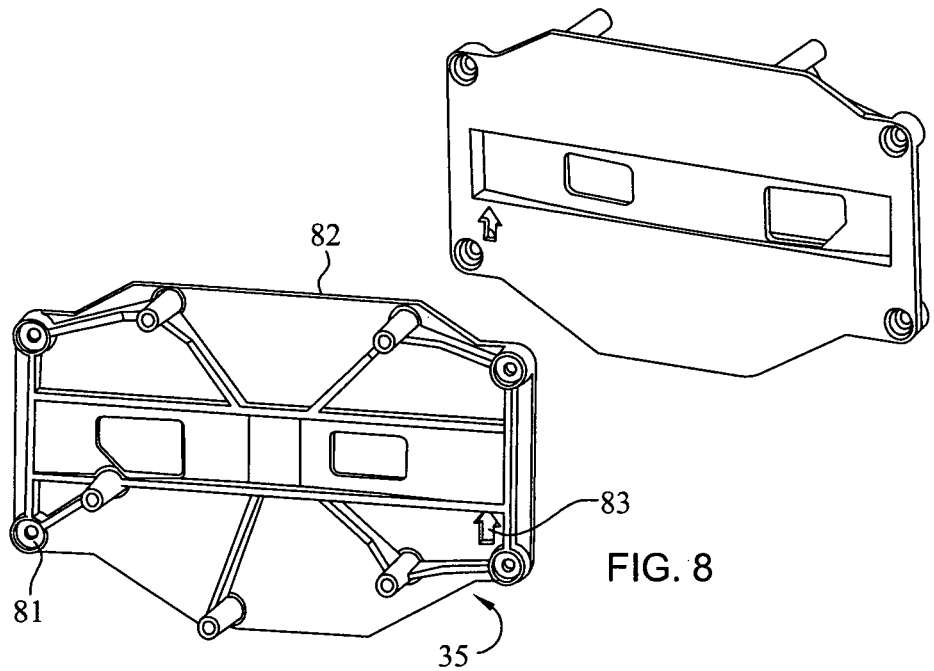
FIG. 8 is a perspective view of a top adaptor.

FIG. 8 illustrates an adaptor plate for a large actuator. The location of the mounting openings 81 and the shape of the perimeter 82 prevent the mounting plate 35 from being assembled in the wrong orientation with respect to the chassis. The adaptor plate may have moulded-in visual features such as an arrow 83 that further assist the assembler with orienting the adaptor plate 35 into the correct orientation and location.

Figure 9:
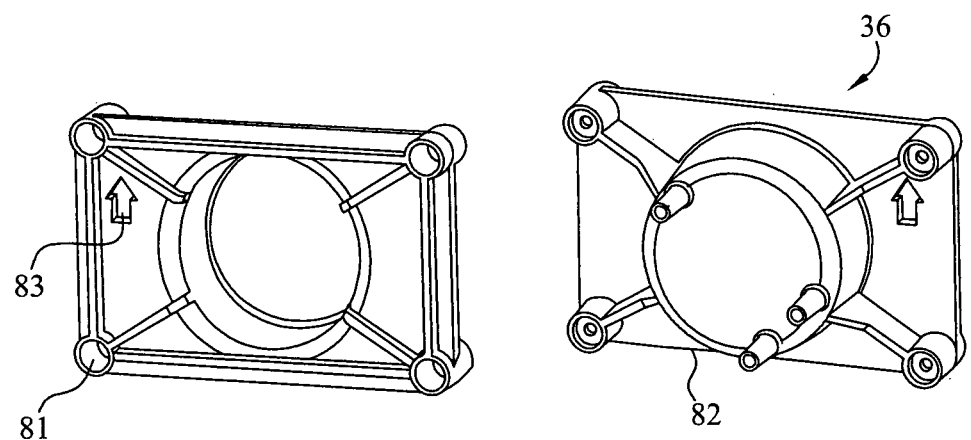
FIG. 9 is a perspective view of a bottom adaptor.

FIG. 9 illustrates another style of mounting plate. Similar features 81, 82, 83 previously described with reference to FIG. 8 provide similar advantages with respect to this and other styles of adaptor plate.

Figure 10:
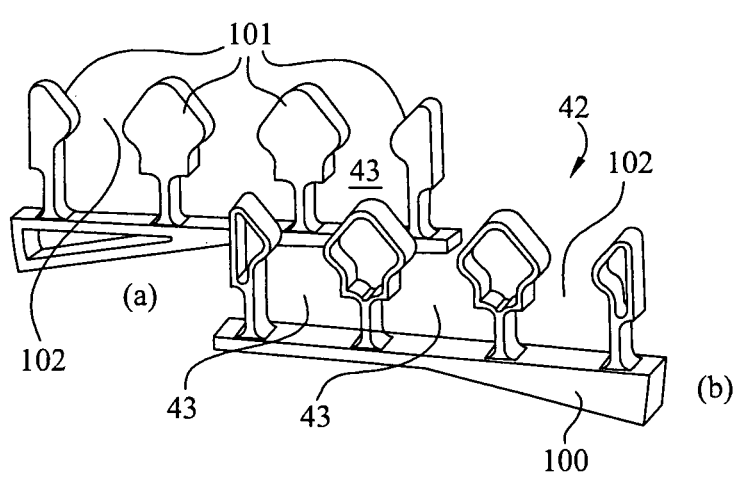
FIG. 10(a) is a perspective view of an assembly clip.
FIG. 10(b) is a perspective view depicting the observe of the clip depicted in FIG. 10(a)

FIGS. 10(*a*) and (*b*) illustrate top and bottom views of the assembly clamp. The features and functions of the clamp have been discussed in previous paragraphs.

Figures 11, 12:
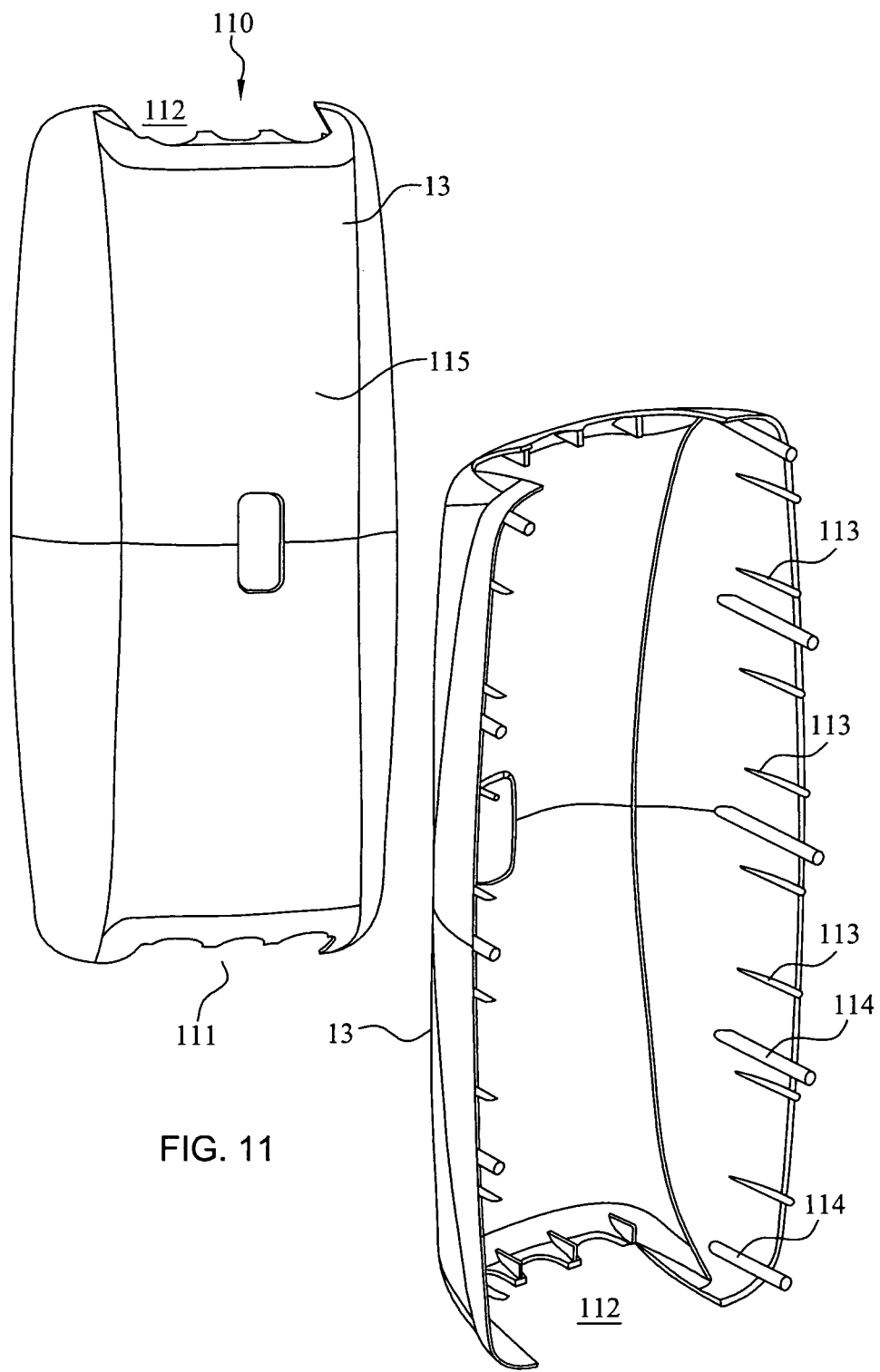
FIG. 11 is a rear perspective view of the cover.
FIG. 12 is a front perspective view of the cover depicted in FIG. 11.

With reference to FIGS. 11 and 12, it can be seen that the cover 13 comprises a thin moulded shell that is symmetrical from top to bottom but not from left to right. The top and bottom edges 110, 111 of the cover define recesses 112 that work in conjunction with the cover blanks 22 (see FIG. 13) to define the two or more (preferably three) openings for receiving the vertical pole 17. The interior surface of the cover around the periphery is seen to form stiffening and locating ribs 113 as well as hollow posts 114 that are used to engage the rim of the chassis. FIG. 11 illustrates that the central longitudinal extent of the cover 13 forms a longitudinal bulge 115 that is provided to better accommodate the various positions that the vertical pole can assume.

Figure 13:
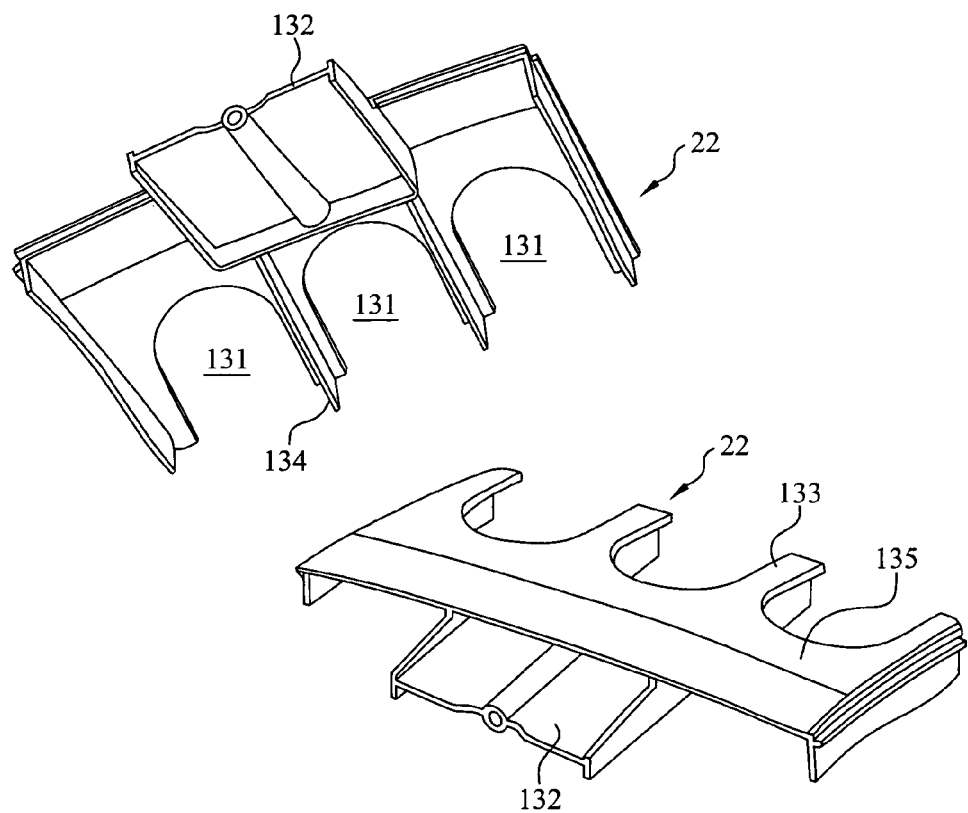
FIG. 13 is a perspective view of a cover blank.

As shown in FIG. 13, the cover blank 22 comprises a thin moulding defining three opening ended recesses 131 and an assembly tang 132. The assembly tang 132 is received by the chassis and the thin web defined the opening ended recesses 131 fits within the recesses 112 formed in the cover (see FIGS. 11 and 12). The extensions 133 between adjacent recesses 131 are rigidised with a reinforcing rim 134. The upper surface 135 of the cover blank 22 is intended to be flush with the outer surface of the cover 13.

Figure 14:
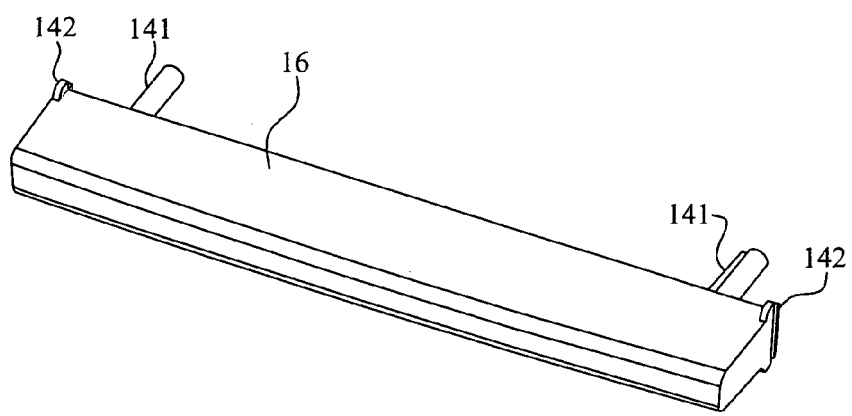
FIG. 14 is a perspective view of a divider.

The divider is depicted in FIG. 14. The divider 16 has a pair of posts 141 that are engaged by fasteners that pass through the chassis. Laterally extending tongues 142 locate the divider 16 with respect to the lateral openings 48 formed in the chassis. The divider is essentially optional but serves to rigidise the chassis, facilitate installation by defining the subcompartments into which the actuators and mirrors will be fitted.

Aspects of the mirror assembly design that relate to its aerodynamic features are explained with referenced to 15, 16 and 17.

Figure 15:
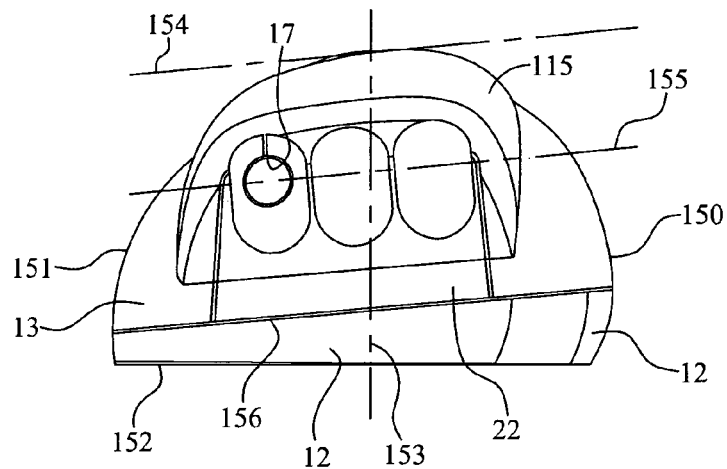
FIG. 15 is a top plan view illustrating the assembly of chassis, cover blank and cover.

As shown in the top plan view of FIG. 15 the front surface of 152 of the rim 12 of the chassis 11 can be though of as a flat reference surface. A medial plane 153 subdivides the assembly longitudinally and is perpendicular to the reference surface 152. The medial plane 153 is also parallel to the longitudinal axis as defined, for example, by the vertical pole 17. This illustrations clearly shows that the longitudinal "halves" that join along the medial plane 153 are not equal. In this illustration, the right hand half incorporates the leading edge 150 and the left hand half incorporates the trailing edge 151. Similarly, the central bulge 115 is skewed so that a tangent line 154 drawn where the upper surface of the bulge 115 intersects the medial plane 153 (where it passes through the outer surface of the cover) is not parallel with the reference surface 152. Similarly, an imaginary line 155 that passes through the centres of the mounting locations for the vertical pole is not parallel with the reference surface 152. Thus, the entire exterior structure is skewed with reference to the flat front surface of the rim 152. In order to injection mould such a structure, incorporating the skew (and the rounded leading and trailing edges 150,151) the parting line 156 between the chassis it and its rim 12 and the case 13 is inclined so that it is generally slanted with respect to the reference surface 152 but generally parallel to the imaginary line 155 and the tangent 154. This allows the proper draught angle to be maintained, particularly in the moulding of the cover 13.

Figure 16:
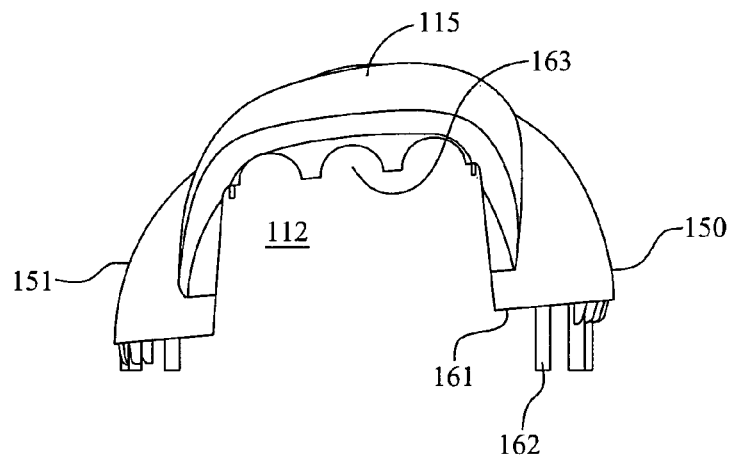
FIG. 16 is a top plan view of the cover.

The cover moulding without the cover blank 22 is depicted in top plan view in FIG. 16. It can be seen that the rim engaging surface 161 is inclined with respect to the reference surface 152 and that thus the mounting bosses adjacent the leading edge 150 are longer than those that are adjacent to the trailing edge 151. Also shown are the semi-circular of lunette shaped recesses 163 that cooperate with the opened ended recesses 131 of the cover blank to define the openings for receiving the grommets (see FIG. 13).

Figure 17:
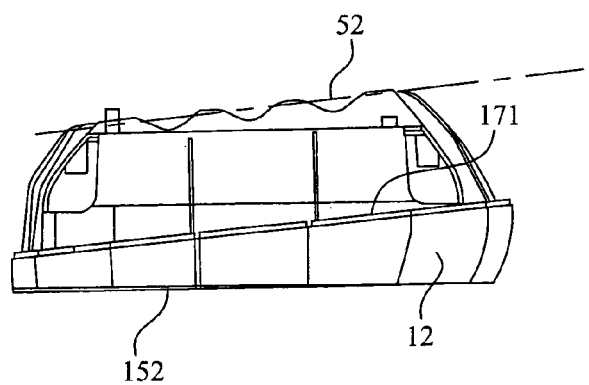
FIG. 17 is a top plan view of the chassis.

FIG. 17 illustrates the chassis moulding in top plan view. Note that the distal edge 171 of the rim 12 is inclined with reference to the flat front surface 152. The centres of the "V" shaped grooves 52 (see FIG. 5) are also inclined with respect to the reference surface 152 but generally parallel with the distal edge 171 of the rim 12.

Figure 18:
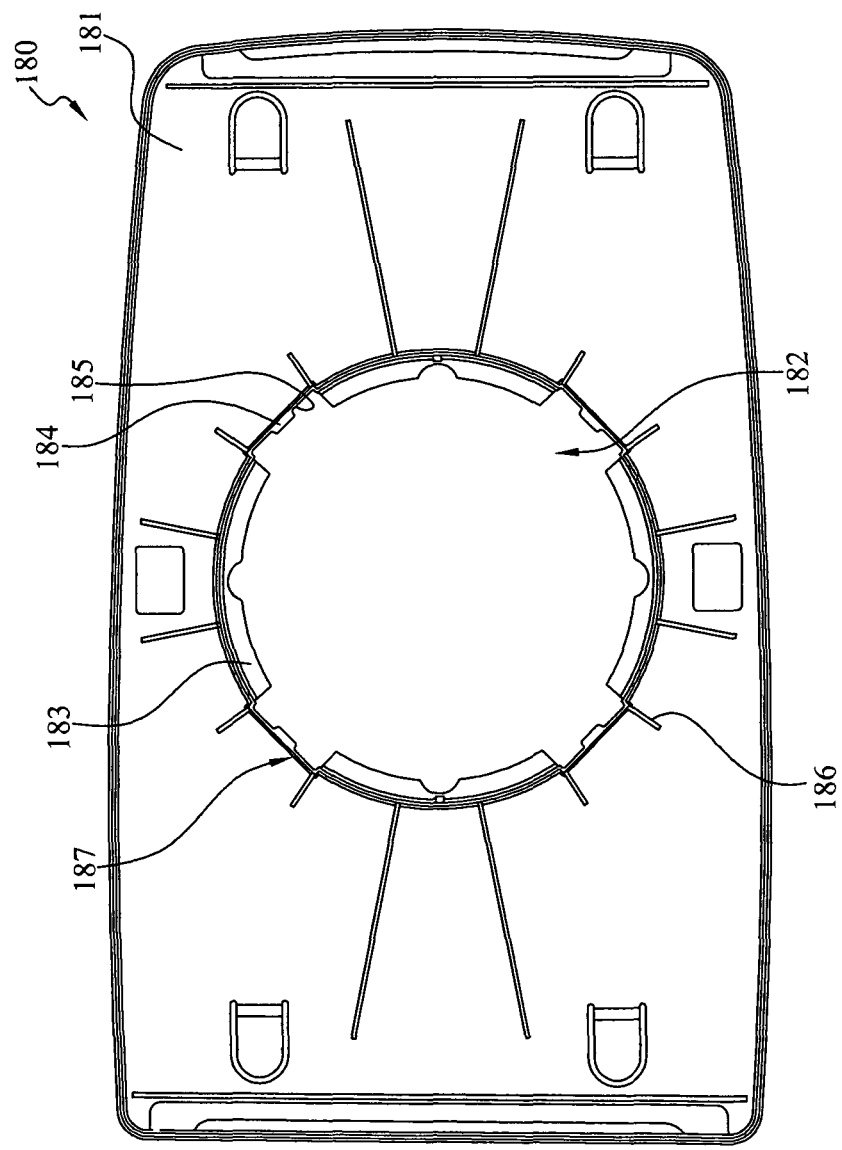
FIG. 18 is a rear plan view of a mirror frame.

FIG. 18 illustrates a mirror frame 180 in the rear plan view. Note that the rear face of the mirror faces toward the front of the vehicle. The mirror frame 180 facilitates the assembly of the mirror onto the actuator 37. Referring to FIGS. 18 to 21, the mirror frame 180 comprises a moulded plate 181 that has formed in it an approximately central actuator opening 182. The rim 187 of the actuator opening 182 is adapted to receive one actuator 37. The rim 187 comprises a plurality of inwardly directed mounting rim portions 183. The rim 197 further comprises an array of sidewall portions 185 having retaining tabs (or "retaining teeth") 184. The rim portions 183 are interrupted by the individual sidewall portions 185.

Figure 19:
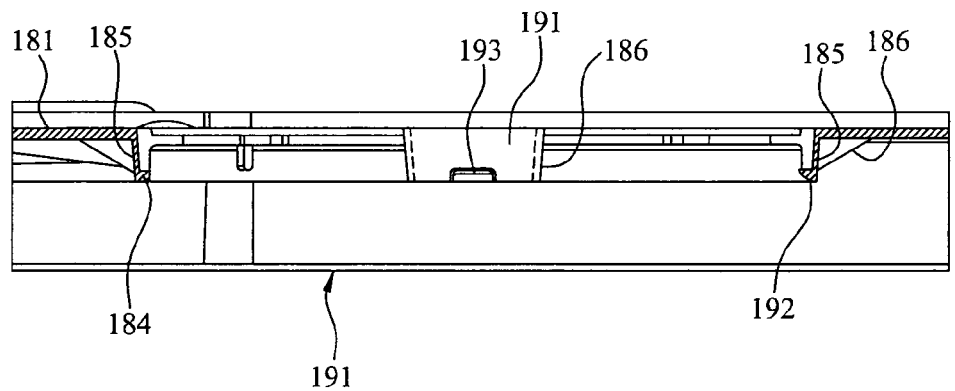
FIG. 19 is a cross section of the mirror frame depicting the cross section of a retaining tab.

As shown in FIG. 19, each sidewall portion 185 extends away from the front or reflective surface of the mirror and is inclined toward the interior of the opening 182. Each tab or tooth 184 is integral with a corresponding sidewall portion 185. The rear face 192 of each tab may be chamfered to facilitate the mounting of the actuator 37. Each retaining tab 184 is adapted to enter a circumferential groove formed adjacent to the proximal face 37*c* of the actuator 37 (see FIG. 3). Each flexible sidewall portion 185 may be buttressed by a pair of lateral fillets (or "webs") 186. In this example, the lateral fillets 186 are triangular in cross section.

Figure 20:
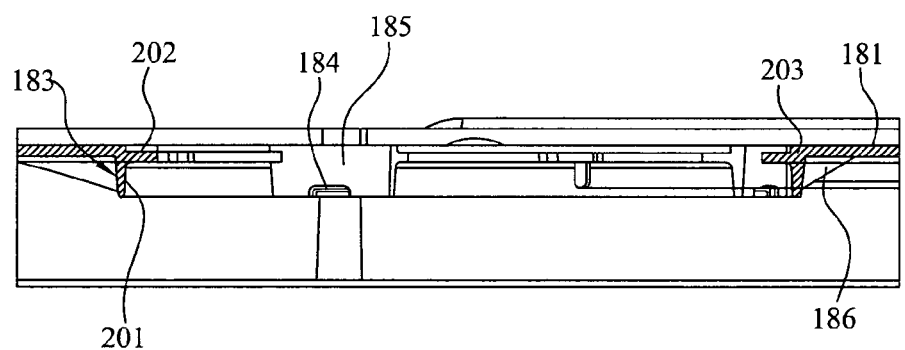
FIG. 20 is another cross section of the mirror frame depicting the cross section of a rim portion.

As shown in FIG. 20, each rim portion 183 comprises a curved side member 201 and a seat member 202. The side member 201 is a circumferential segment around the opening 182. The seat member 202 is located near the front edge 203 of the side member 201, and extends into the opening 182.

Figure 21:
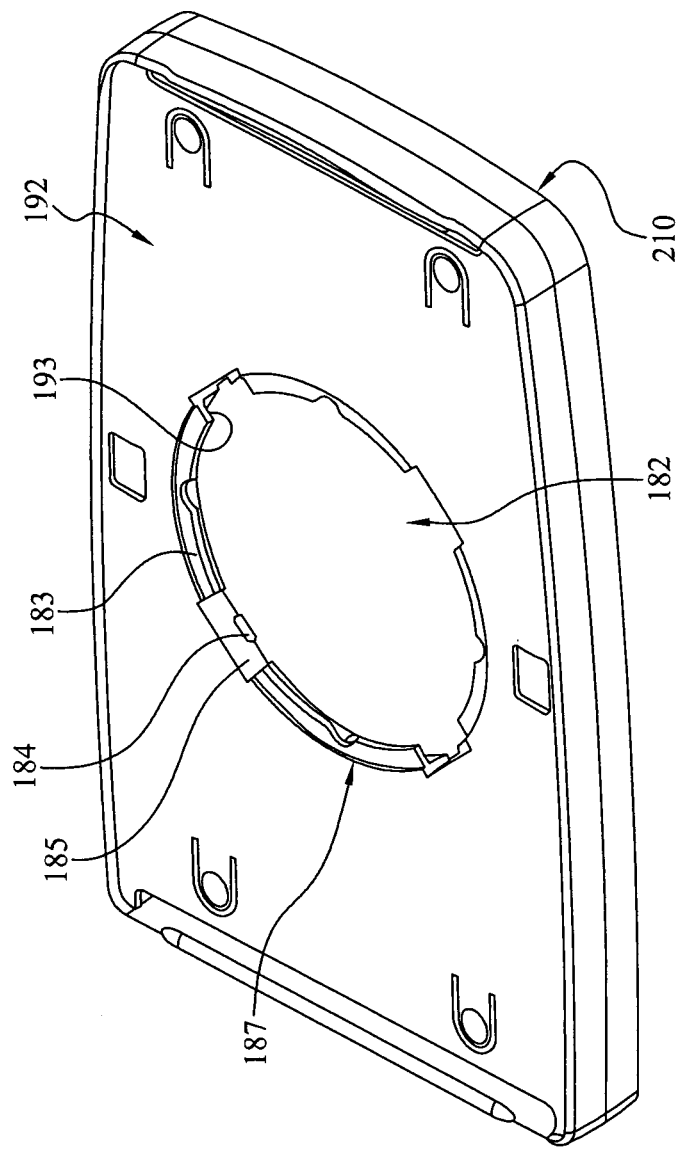
FIG. 21 is a perspective view of the mirror frame.

Referring to FIG. 21, the actuator 37 (not shown) is adapted to approach the opening 182 from the rear face 210 of the frame 180. The entire rim 187 is therefore adapted to retain the actuator 37 (not shown). As the front face of the actuator 37 passes the tabs 184, it sits on or adjacent to the seat members 202. The flexible sidewalls 185 flex and allow the tabs 184 to flex, then snap back into the actuator's circumferential groove as the actuator 37 comes into position with respect to the seat members 202.

While the mirror assembly of the present invention has been disclosed with reference to particular details of construction, these should be understood as having been provided by way of example and not as limitations to the scope or spirit of the invention.

What is claimed is:

1. A rear view mirror, for being supported by a vertical pole attached to a vehicle, comprising:
a housing having a chassis and a cover;
the chassis supporting one or more mirrors;

the cover further comprising a leading edge and a trailing edge;

the housing having three pairs of through openings for receiving the vertical pole, provided in cooperating top and bottom pairs, through which may pass the vertical pole; and the chassis having mounting surfaces with grooves to engage the vertical pole for lateral adjustment with a clamp to affix the vertical pole to the chassis.

2. The rear view mirror of claim 1, wherein:
at least one mirror is adjustable with a motorised actuator contained in the housing.

3. The rear view mirror of claim 1, wherein:
the housing has top to bottom symmetry so that it can be, in use, inverted and used on either side of a vehicle.

4. The rear view mirror of claim 1, wherein:
plugs are provided for blocking any opening that does not have the vertical pole passing through it.

5. The rear view mirror of claim 1, wherein:
the cover has an interior surface that is adapted to receive a bridge that subdivides an internal space of the cover into segments, each segment adapted to receive a mirror.

6. The rear view mirror of claim 5, wherein:
the interior surface can receive the bridge so as to subdivide the internal space of the cover into either equal or unequal segments.

7. The rear view mirror of claim 1, wherein:
the chassis is adapted to receive one or more assembly clips, each clip having flexible fingers for receiving the vertical pole.

8. The rear view mirror of claim 1, wherein:
the chassis has a central web with a back surface in which is formed pole retaining grooves.

9. The rear view mirror of claim 1, wherein:
the leading edge has a greater radius of curvature than the trailing edge.

10. The rear view mirror of claim 1, wherein:
each of a cooperating top and bottom pair of through openings that is to receive the vertical pole is provided with a perforated grommet.

11. The rear view mirror of claim 1, wherein:
an exterior of the cover is skewed with reference to a flat front surface of the chassis.

12. The rear view mirror of claim 1, wherein:
a parting line between the chassis and the cover is inclined with reference to a flat front surface of the chassis so as to allow a proper draught angle to be maintained in a moulding of the cover.

* * * * *